(12) United States Patent
Cao et al.

(10) Patent No.: US 8,929,010 B1
(45) Date of Patent: Jan. 6, 2015

(54) SYSTEMS AND METHODS FOR LOOP PULSE ESTIMATION

(71) Applicant: LSI Corporation, San Jose, CA (US)

(72) Inventors: Rui Cao, San Jose, CA (US); Yu Kou, San Jose, CA (US); Xuebin Wu, San Jose, CA (US); Yang Han, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/029,559

(22) Filed: Sep. 17, 2013

Related U.S. Application Data

(60) Provisional application No. 61/868,196, filed on Aug. 21, 2013.

(51) Int. Cl.
*G11B 20/10* (2006.01)
*G11B 5/035* (2006.01)
*H04L 25/03* (2006.01)

(52) U.S. Cl.
CPC .......... *G11B 5/035* (2013.01); *H04L 25/03885* (2013.01)
USPC ........................................................... 360/39

(58) Field of Classification Search
None
See application file for complete search history.

(56) References Cited

U.S. PATENT DOCUMENTS

| | | |
|---|---|---|
| 5,262,904 A | 11/1993 | Tang |
| 5,357,520 A | 10/1994 | Arnett |
| 5,493,454 A | 2/1996 | Ziperovich |
| 5,517,146 A | 5/1996 | Yamasaki |
| 5,583,705 A | 12/1996 | Ziperovich |
| 5,781,358 A | 7/1998 | Hasegawa |
| 5,872,664 A | 2/1999 | Meier |
| 5,986,830 A | 11/1999 | Hein |
| 5,999,355 A | 12/1999 | Behrens |
| 6,043,942 A | 3/2000 | Cunningham |
| 6,091,560 A | 7/2000 | Du |
| 6,130,794 A | 10/2000 | Christensen |
| 6,134,691 A | 10/2000 | Hirasaka |
| 6,141,168 A | 10/2000 | Takahashi |
| 6,147,828 A | 11/2000 | Bloodworth |
| 6,181,505 B1 | 1/2001 | Sacks |
| 6,208,477 B1 | 3/2001 | Cloke |
| 6,208,481 B1 | 3/2001 | Spurbeck |
| 6,212,024 B1 | 4/2001 | Igarashi |
| 6,243,031 B1 | 6/2001 | Jusuf |

(Continued)

FOREIGN PATENT DOCUMENTS

| | | |
|---|---|---|
| DE | 10127447 | 10/2002 |
| GB | 2 320 866 | 6/1997 |

OTHER PUBLICATIONS

Barry J. et al "Iterative Timing Recovery" IEEE Signal Processing Magazine vol. 21, No. 1, Jan. 1, 2004.

(Continued)

*Primary Examiner* — Regina N Holder
(74) *Attorney, Agent, or Firm* — Hamilton DeSanctis & Cha

(57) ABSTRACT

A data processing system includes a digital data input operable to receive digital data, a digital data values input operable to receive values of the digital data, a loop pulse response estimation circuit operable to calculate a loop pulse response based on the digital data and the values of the digital data and based at least in part on past values of the loop pulse response, and a scaling circuit operable to scale the loop pulse response based at least in part on an absolute sum of the loop pulse response to yield a scaled loop pulse response.

20 Claims, 5 Drawing Sheets

(56) References Cited

U.S. PATENT DOCUMENTS

| | | |
|---|---|---|
| 6,246,723 B1 | 6/2001 | Bliss et al. |
| 6,337,778 B1 | 1/2002 | Gagne |
| 6,396,651 B1 | 5/2002 | Grover |
| 6,404,572 B1 | 6/2002 | Hong |
| 6,535,345 B1 | 3/2003 | Shimoda |
| 6,535,553 B1 | 3/2003 | Limberg et al. |
| 6,563,655 B1 | 5/2003 | Yamasaki |
| 6,621,648 B2 | 9/2003 | Elliott |
| 6,662,303 B1 | 12/2003 | Toosky |
| 6,671,244 B2 | 12/2003 | Honma |
| 6,674,590 B2 | 1/2004 | Ottesen |
| 6,678,230 B2 | 1/2004 | Miyashita |
| 6,721,114 B1 | 4/2004 | Sutardja |
| 6,788,481 B2 | 9/2004 | Fang |
| 6,831,797 B2 | 12/2004 | Koller |
| 6,894,854 B1 | 5/2005 | Carlson |
| 6,912,682 B1 | 6/2005 | Aoki |
| 6,934,100 B2 | 8/2005 | Ueno |
| 6,937,415 B2 | 8/2005 | Galbraith |
| 7,012,772 B1 | 3/2006 | Vis |
| 7,079,342 B1 | 7/2006 | Han |
| 7,092,179 B2 | 8/2006 | Yamanouchi |
| 7,092,180 B2 | 8/2006 | Franck |
| 7,123,429 B2 | 10/2006 | Musungu |
| 7,126,773 B1 | 10/2006 | Taratorin |
| 7,139,143 B2 | 11/2006 | Tsunoda |
| 7,158,324 B2 | 1/2007 | Stein |
| 7,170,704 B2 | 1/2007 | DeGroat |
| 7,193,802 B2 | 3/2007 | Cideciyan |
| 7,248,424 B2 | 7/2007 | Ueno |
| 7,248,630 B2 | 7/2007 | Modrie |
| 7,256,954 B2 | 8/2007 | Serizawa |
| 7,257,764 B2 | 8/2007 | Suzuki |
| 7,262,928 B1 | 8/2007 | Oberg |
| 7,271,753 B1 | 9/2007 | Padukone |
| 7,277,376 B2 | 10/2007 | Horie |
| 7,305,027 B2 | 12/2007 | Chang |
| 7,308,057 B1 | 12/2007 | Patapoutian |
| 7,421,017 B2 | 9/2008 | Takatsu |
| 7,426,236 B1 | 9/2008 | He |
| 7,440,224 B2 | 10/2008 | Ehrlich |
| 7,460,323 B2 | 12/2008 | Lee |
| 7,480,110 B2 | 1/2009 | Brittenham |
| 7,495,854 B2 | 2/2009 | Hutchins |
| 7,502,189 B2 | 3/2009 | Sawaguchi |
| 7,529,320 B2 | 5/2009 | Byrne et al. |
| 7,542,227 B2 | 6/2009 | Che |
| 7,589,924 B2 | 9/2009 | Yoshizawa |
| 7,606,300 B2 | 10/2009 | Lim |
| 7,643,238 B2 | 1/2010 | DeGroa |
| 7,696,838 B2 | 4/2010 | Wada |
| 7,715,135 B1 | 5/2010 | Sutardja |
| 7,715,471 B2 | 5/2010 | Werner |
| 7,733,591 B2 | 6/2010 | Bottemiller |
| 7,859,780 B2 | 12/2010 | Mathew |
| 7,872,821 B2 | 1/2011 | Grundvig |
| 7,872,823 B2 | 1/2011 | Liu |
| 7,924,518 B2 | 4/2011 | Mathew |
| 7,924,523 B2 | 4/2011 | Mathew |
| 7,929,240 B2 | 4/2011 | Mathew |
| 7,929,597 B2 | 4/2011 | Mergen |
| 7,936,655 B2 | 5/2011 | Hong |
| 7,948,699 B2 | 5/2011 | Liu |
| 7,948,702 B2 | 5/2011 | Mueller |
| 7,957,251 B2 | 6/2011 | Ratnakar Aravind |
| 7,965,467 B2 | 6/2011 | Mueller |
| 7,969,337 B2 | 6/2011 | Ratnakar Aravind |
| 7,974,030 B2 | 7/2011 | Mathew |
| 8,018,360 B2 | 9/2011 | Nayak |
| 8,046,666 B2 | 10/2011 | Park et al. |
| 8,139,305 B2 | 3/2012 | Mathew |
| 8,154,815 B2 | 4/2012 | Mueller |
| 8,175,201 B2 | 5/2012 | Mathew |
| 8,208,213 B2 | 6/2012 | Liu |
| 2005/0169415 A1 | 8/2005 | Nayak |
| 2006/0123285 A1 | 6/2006 | De Araujo |
| 2007/0140088 A1 | 6/2007 | Hino |
| 2007/0236270 A1 | 10/2007 | Chiang |
| 2007/0260623 A1 | 11/2007 | Jaquette |
| 2008/0032652 A1 | 2/2008 | Zhao |
| 2008/0049825 A1 | 2/2008 | Chen |
| 2009/0002862 A1 | 1/2009 | Park |
| 2010/0067621 A1 | 3/2010 | Noeldner |
| 2010/0088357 A1 | 4/2010 | Mathew |
| 2011/0072335 A1 | 3/2011 | Liu et al. |
| 2011/0075569 A1 | 3/2011 | Marrow |
| 2011/0164332 A1 | 7/2011 | Cao |
| 2011/0164669 A1 | 7/2011 | Mathew |
| 2011/0167227 A1 | 7/2011 | Yang et al. |
| 2012/0019946 A1 | 1/2012 | Aravind |
| 2012/0056612 A1 | 3/2012 | Mathew |
| 2012/0069891 A1 | 3/2012 | Zhang |
| 2012/0089657 A1 | 4/2012 | Yang |
| 2012/0124119 A1 | 5/2012 | Yang |
| 2012/0236430 A1 | 9/2012 | Tan |
| 2013/0054664 A1 | 2/2013 | Chang |

OTHER PUBLICATIONS

Cho and Lee, "An Estimation Technique for Nonlinear Distortion in High Density Magnetic Recording Channels", IEEE Transactions on Magnetics, vol. 34, No. 1, pp. 40-44 Jan. 1998.

Degroat et al., "Experimental Characterization of Media Noise Based on Equalized Synchronized Drive Data", IEEE Trans. Magnetics, vol. 37, No. 2, pp. 633-638, Mar. 2001.

Farhang-Boroujeny, Adaptive Filters: Theory and Applications. John Wiley & Sons Ltd, 1998, Chapter 11. pp. 373-379.

Kavcic and Patapoutian, "A Signal-Dependent Autoregressive Channel Model", IEEE Trans. Magnetics, vol. 35 No. 5, pp. 2316-2318, Sep. 1999.

Lin et al. "An estimation technique for accurately modelling the magnetic recording channel including nonlinearities." IEEE Trans. Mag, vol. 25, No. 5, pp. 4084-4086, Sep. 1989.

Moon, J., "Signal-to-Noise Ratio Definition for Magnetic Recording Channels With Transition Noise", IEEE Trans. Magnetics, vol. 36, No. 5, pp. 3881-3883, Sep. 2000.

Palmer et al, "Identification of nonlinear write effects using pseudo-random sequences" IEEE Trans. Magnetics, vol. 23 No. 5, pp. 2377-2379, Sep. 1987.

Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.

Tokumasu et al. "A New Reduced Clock-Swing Flip-Flop (NDKFF)," Corporate Research & Development Center, Toshiba Corporation. IEEE Feb. 2002 Custom Integrated Circuits Conf.

U.S. Appl. No. 13/272,209, filed Oct. 12, 2011, Yu Liao, Unpublished.

U.S. Appl. No. 13/100,063, filed May 3, 2011, Ming Jin, Unpublished.

U.S. Appl. No. 13/239,719, filed Sep. 22, 2011, Haitao Xia, Unpublished.

U.S. Appl. No. 13/912,171, filed Jun. 6, 2013, Lu Lu, Unpublished.

U.S. Appl. No. 13/346,556, filed Jan. 9, 2012, Haitao Xia, Unpublished.

U.S. Appl. No. 13/525,182, filed Jun. 15, 2012, Yang Han, Unpublished.

U.S. Appl. No. 13/525,188, filed Jun. 15, 2012, Yang Han, Unpublished.

U.S. Appl. No. 13/545,784, filed Jul. 10, 2012, Yu Liao, Unpublished.

U.S. Appl. No. 13/551,507, filed Jul. 17, 2012, Ming Jin, Unpublished.

U.S. Appl. No. 13/742,336, filed Jan. 15, 2013, Jianzhong Huang, Unpublished.

U.S. Appl. No. 13/562,140, filed Jul. 30, 2012, Haotian Zhang, Unpublished.

U.S. Appl. No. 13/597,046, filed Aug. 28, 2012, Lu Pan, Unpublished.

U.S. Appl. No. 13/777,915, filed Feb. 26, 2013, Jun Xiao, Unpublished.

(56) References Cited

OTHER PUBLICATIONS

U.S. Appl. No. 13/180,311, filed Jul. 11, 2011, Weijun Tan, Unpublished.
U.S. Appl. No. 13/912,159, filed Jun. 6, 2013, Jin Lu, Unpublished.
U.S. Appl. No. 13/491,062, filed Jun. 7, 2012, Jin Lu, Unpublished.
Wood and Donaldson, "The Helical-Scan Magnetic Tape Recorder as a Digital Communication Channel", IEEE Transactions on Magnetics, vol. MAG-15, No. 2, pp. 935-943 Mar. 1979.

SYSTEMS AND METHODS FOR LOOP PULSE ESTIMATION

CROSS REFERENCE TO RELATED APPLICATIONS

The present application claims priority to (is a non-provisional of) U.S. Pat. App. No. 61/868,196, entitled "Systems and Methods For Loop Pulse Estimation", and filed Aug. 21, 2013 by Cao et al, the entirety of which is incorporated herein by reference for all purposes.

FIELD OF THE INVENTION

Various embodiments of the present invention provide systems and methods for loop pulse estimation for use by a gain loop.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. Feedback loops can be used to prepare the data for processing to reduce losses in data.

SUMMARY

Various embodiments of the present invention provide systems and methods for loop pulse estimation for use by a gain loop. In some embodiments, a data processing system includes a digital data input operable to receive digital data, a digital data values input operable to receive values of the digital data, a loop pulse response estimation circuit operable to calculate a loop pulse response based on the digital data and the values of the digital data and based at least in part on past values of the loop pulse response, and a scaling circuit operable to scale the loop pulse response based at least in part on an absolute sum of the loop pulse response to yield a scaled loop pulse response.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Various embodiments of the present invention provide systems and methods for loop pulse estimation with an absolute sum constraint. This estimates the channel pulse or bit response of a data processing system such as, but not limited to, the read channel of a magnetic storage device. As data is processed, a variable gain amplifier controls the gain of an input analog signal before it is sampled by an analog to digital converter and subsequently processed. To regulate the signal amplitude from the variable gain amplifier, a gain loop drives the variable gain amplifier to a target amplitude based on the loop pulse estimation. The loop pulse estimation satisfies an amplitude constraint in order to provide correct target values for the gain loop.

In some embodiments, the loop pulse estimation yields a loop pulse response for the data channel, which can be in the form of filter tap coefficients. The loop pulse estimation is performed in multiple stages, with an estimation stage followed by a scaling stage. This enables the use of a least mean square algorithm to perform the estimation stage, followed by scaling using a non-linear absolute sum constraint to the tap coefficients in a recursive fashion. The resulting loop pulse response can be used to directly control the range of samples from an analog to digital converter through the absolute sum constraint value. The target analog to digital converter range is the same as the absolute sum constraint value, thus the gain loop can drive the analog to digital converter to the target range with a straightforward parameter setting.

Loop pulse estimation with an absolute sum constraint is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 1:
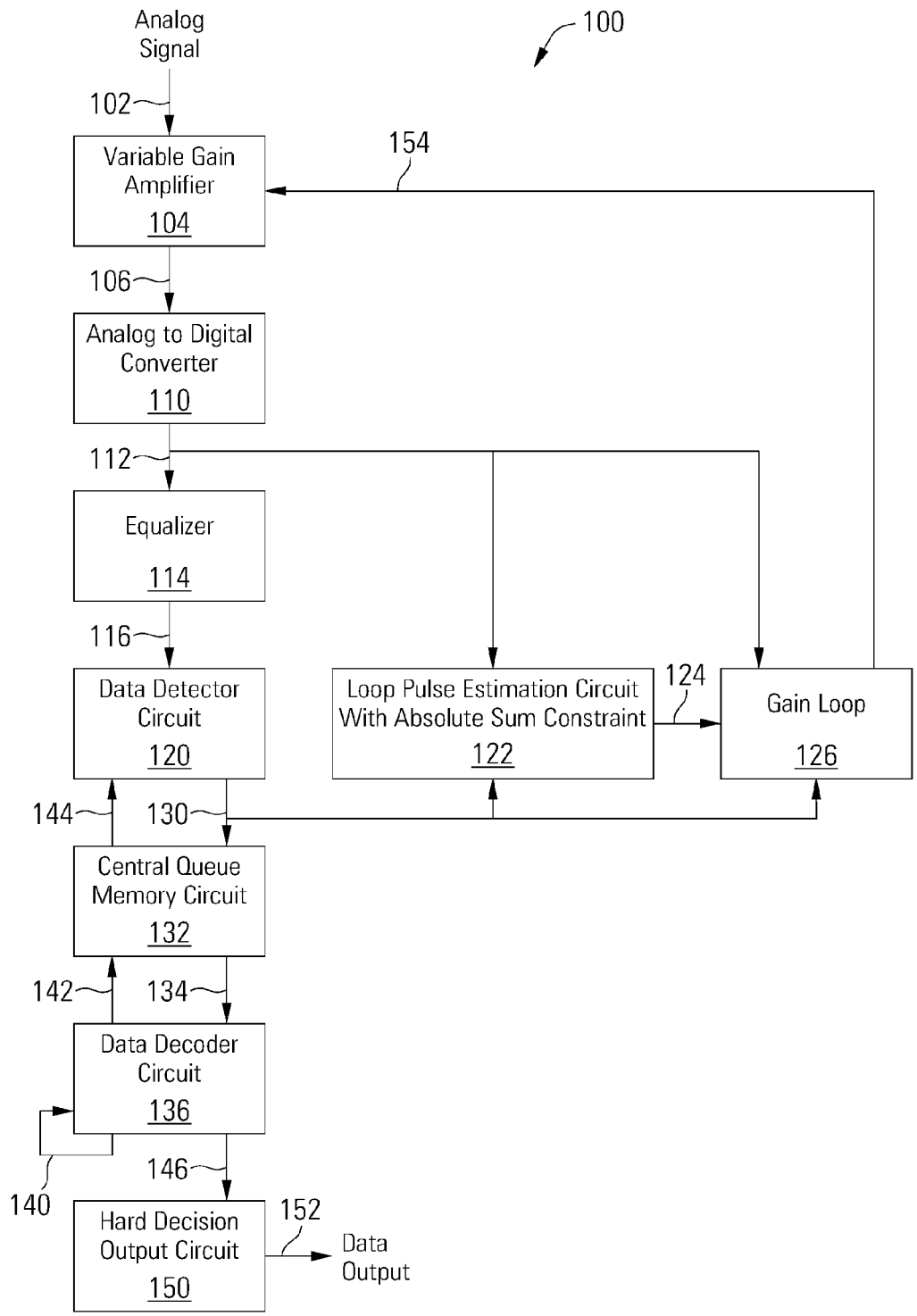
FIG. 1 is a block diagram of a data processing system including loop pulse estimation with an absolute sum constraint in accordance with some embodiments of the present invention.

Turning to FIG. 1, a data processing system 100 including loop pulse estimation with an absolute sum constraint is depicted in accordance with some embodiments of the present invention. Data processing system 100 includes a variable gain amplifier 104 that receives an analog signal 102. Variable gain amplifier 104 amplifies analog signal 102 and provides an amplified analog signal 106 to an analog to digital converter 110. Variable gain amplifier 104 may include any suitable circuit for amplifying an analog signal with the gain or amplification adjusted by a gain error signal 154. Based upon the disclosure provided herein, one of ordinary skill in the art will recognize a variety of circuitry that may be included as part of variable gain amplifier 104. In some cases, analog signal 102 is derived from a read/write head assembly (not shown) that is disposed in relation to a storage medium (not shown). Based upon the disclosure provided herein, one of ordinary skill in the art will recognize a variety of sources from which analog signal 102 may be derived.

Analog to digital converter 110 converts amplified analog signal 106 into a corresponding series of digital samples 112. Analog to digital converter 110 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In order to yield the best digital samples 112, the amplified analog signal 106 should be amplified to use the full scale or range of the analog to digital converter 110 while avoiding or reducing clipping or saturated sample values. The gain error signal 154 is thus adjusted by the loop pulse estimation to cause the variable gain amplifier 104 to amplify the amplified analog signal 106 based on the input range of the analog to digital converter 110.

An equalizer circuit 114 receives digital samples 112 and applies an equalization algorithm to digital samples 112 to yield an equalized output 116. In some embodiments of the present invention, equalizer circuit 114 is a digital finite impulse response filter circuit as are known in the art. In some cases, equalizer circuit 114 includes sufficient memory to maintain one or more codewords until a data detector circuit 120 is available for processing, and for multiple passes through data detector circuit 120.

Data detector circuit 120 is a circuit capable of producing a detected output 130 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. In some embodiments, data detector circuit 120 provides both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

The detected output 130 is used in some embodiments as ideal or known values of the digital samples 112 or are used to derive the ideal values. These ideal samples can be used to drive various front-end control loops, such as a gain loop 126 used to control the variable gain amplifier 104. To achieve a reliable and efficient gain loop, the gain loop 126 drives the variable gain amplifier 104 to a target sample amplitude. To regulate the signal amplitude in the gain loop 126, a loop pulse estimation circuit with absolute sum constraint 122 satisfies an amplitude constraint so that it can provide correct target values for the gain loop 126 to adjust. A least mean squares algorithm is applied to the digital samples 112 and detected output 130 in loop pulse estimation circuit with absolute sum constraint 122 to obtain the bit response of the data channel, yielding a loop pulse response 124, also referred to herein as loop pulse response taps or tap coefficients. The loop pulse estimation circuit 122 also applies an absolute sum constraint, or a constraint based on the absolute sum of the loop pulse response taps. Because of the nonlinearity of the absolute sum constraint, given that some of the taps have negative values, the loop pulse estimation circuit 122 applies a recursive or multi-stage algorithm to apply the absolute sum constraint.

The loop pulse response taps are estimated in some embodiments according to Equation 1, based on a least mean square algorithm without an absolute sum constraint:

$$LPE(k) \mathrel{+}= \mu * \left[ x(n) - \sum_{i=-m+1}^{p} a(n-i) * LPE(i) \right] * a(n-k) \quad (Eq\ 1)$$

where x(n) is the current input bit, a(n) is the ideal value (either −1 or 1) of the current input bit, k is the index of the tap coefficient being calculated with values ranging from −m+1 to p, μ, is the update gain, and n is the bit index for the incoming data stream, with the loop pulse response taps LPE (k) being updated for each new bit n in the data stream. The update gain μ, scales the update values applied to tap coefficients so changes are applied gradually, preventing values from oscillating or changing wildly. For example, to calculate several of the tap coefficients in a system wherein m=5 and p=5, equation 1 can be applied as follows:

k=0: LPE(0)+=μ*{x(n)−[a(n+4)*LPE(−4)+a(n+3)
*LPE(−3)+a(n+2)*LPE(−2)+a(n+1)*LPE(−1)+a
(n)*LPE(0)+a(n−1)*LPE(1)+a(n−2)*LPE(2)+a
(n−3)*LPE(3)+a(n−4)*LPE(4)+a(n−5)*LPE(5)]
}*a(n)

k=−1: LPE(−1)+=μ*{x(n)−[a(n+4)*LPE(−4)+a(n+3)
*LPE(−3)+a(n+2)*LPE(−2)+a(n+1)*LPE(−1)+a
(n)*LPE(0)+a(n−1)*LPE(1)+a(n−2)*LPE(2)+a
(n−3)*LPE(3)+a(n−4)*LPE(4)+a(n−5)*LPE(5)]
}*a(n+1)

k=1 LPE(1)+=μ*{x(n)−[a(n+4)*LPE(−4)+a(n+3)
*LPE(−3)+a(n+2)*LPE(−2)+a(n+1)*LPE(−1)+a
(n)*LPE(0)+a(n−1)*LPE(1)+a(n−2)*LPE(2)+a
(n−3)*LPE(3)+a(n−4)*LPE(4)+a(n−5)*LPE(5)]
}*a(n−1)

Given a non-ideal analog signal 102, the absolute sum of the loop pulse response taps calculated by Equation 1 can be different from the target range of the analog to digital converter 110, ADCMax. At the end of each read event the absolute sum LPE_ASUM of the loop pulse estimation tap values is calculated according to Equation 2:

$$LPE\_ASUM = \sum_{i=-m+1}^{p} |LPE(i)| \quad \text{(Eq 2)}$$

where a read event corresponds to the processing of a particular block of data. In some embodiments, a sector of data includes several read events. In other embodiments, a read event corresponds to a single data sector, or to multiple data sectors, or even to a single bit.

A scaling factor γ is calculated as the ratio of the target range of the analog to digital converter 110, ADCMax to the absolute sum LPE_ASUM of the loop pulse response taps according to Equation 3:

$$\gamma = \frac{ADC\text{Max}}{LPE\_ASUM} \neq 1 \quad \text{(Eq 3)}$$

If the absolute sum LPE_ASUM of the loop pulse response taps is not equal to the target range of the analog to digital converter 110, ADCMax, the scaling factor γ will not be equal to 1, and the loop pulse response taps are scaled in loop pulse estimation circuit 122 by the scaling factor γ according to Equation 4:

$$LPE(i)=\gamma*LPE(i) \quad \text{(Eq 4)}$$

The resulting scaled loop pulse response taps thus satisfy the ADCMax constraint and are output from the loop pulse estimation circuit with absolute sum constraint 122 as the loop pulse response 124, and are also used in the next update of the loop pulse response taps in the loop pulse estimation circuit with absolute sum constraint 122 in a recursive process according to Equations 1-4. The scaling of loop pulse response taps according to Equation 4 is performed in some embodiments after every application of Equation 1. The calculation of a new scaling factor γ can be performed continuously in some embodiments after the loop pulse response taps are calculated per Equation 1. In some other embodiments, the scaling factor γ is updated after each read event, with several read events occurring per data sector received and processed, or with one sector corresponding to a single read event, etc.

In some embodiments, the scaling operation is enabled only when the scaling factor γ differs enough from 1, based on a threshold. When the loop pulse response taps are converging to stable values over the course of a number of estimation processes, the scaling factor γ approaches 1. The absolute sum LPE_ASUM of the loop pulse response taps can oscillate around the target range of the analog to digital converter 110, ADCMax, due to noise and quantization precision. If the scaling process continues to operate, it can cause unnecessary energy cost and could induce instability of the loop pulse response taps 124 and of the gain loop 126. To improve the reliability of loop pulse estimation with absolute sum constraint in some embodiments, a threshold prevents frequent scaling after the system stabilizes. When the difference between the absolute sum LPE_ASUM of the loop pulse response taps and the target ADCMax is smaller than the threshold according to Equation 5, the scaling operation will be disabled:

$$|LPE\_ASUM-ADC\text{Max}|<\text{Threshold} \quad \text{(Eq 5)}$$

The multi-stage estimation and constraint scaling process applied in loop pulse estimation circuit with absolute sum constraint 122 enables the loop pulse response 124 to be scaled in a linear fashion according to the constraint, such as, but not limited to, the ADCMax constraint. The amplitude of the digital samples 112 can thus be controlled by simply adjusting the ADCMax constraint to the desired level, thereby controlling the variable gain amplifier 104 through gain loop 126. In some embodiments, the gain loop 126 includes a comparator that compares the detected output 130 convolved with the loop pulse response 124 with the digital samples 112 to yield the gain error signal 154. The convolution filter in gain loop 126 has a number of filter taps that are configured using the loop pulse response 124. The gain loop 126 can include any comparator and convolution filter circuits as are known in the art. Based upon the disclosure provided herein, one of ordinary skill in the art will recognize a variety of gain loop circuits that may be used in relation to different embodiments of the present invention.

By controlling the gain of the amplified analog signal 106 according to the range of the analog to digital converter 110, the performance of the data processing system 100 is improved and the correct values of the data can better be detected. The data processing system 100 can include any suitable type of data processing circuits to manipulate and use the data in any way. In some embodiments of the data processing system 100, detected output 130 from data detector circuit 120 is provided to a central queue memory circuit 132 that operates to buffer data passed between data detector circuit 120 and data decoder circuit 136. (In some other embodiments, the detected output from another back-end data detector applying the same or a similar algorithm is used.) When data decoder circuit 136 is available, data decoder circuit 136 receives detected output 130 from central queue memory 132 as a decoder input 134. Data decoder circuit 136 applies a data decoding algorithm to decoder input 134 in an attempt to recover originally written data. The result of the data decoding algorithm is provided as a decoded output 142. Similar to detected output 130, decoded output 142 includes both hard decisions and soft decisions in some embodiments. Data decoder circuit 136 may be any data decoder circuit known in the art that is capable of applying a decoding algorithm to a received input. Data decoder circuit 136 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 136 provides the result of the data decoding algorithm as a decoded output 146. Decoded output 146 is provided to a hard decision output circuit 150 where the data is reordered before providing a series of ordered data sets as a data output 152.

One or more iterations through the combination of data detector circuit 120 and data decoder circuit 136 can be made in an effort to converge on the originally written data set. Processing through both the data detector circuit 120 and the data decoder circuit 136 is referred to as a "global iteration". For the first global iteration, data detector circuit 120 applies the data detection algorithm without guidance from a decoded output. For subsequent global iterations, data detector circuit 120 applies the data detection algorithm to equalized output 116 as guided by decoded output 142. Decoded output 142 is received from central queue memory 132 as a detector input 144.

During each global iteration it is possible for data decoder circuit 136 to make one or more local iterations including application of the data decoding algorithm to decoder input 134. For the first local iteration, data decoder circuit 136 applies the data decoder algorithm without guidance from a decoded output 140. For subsequent local iterations, data decoder circuit 136 applies the data decoding algorithm to decoder input 134 as guided by a previous decoded output 140.

Figure 2A:
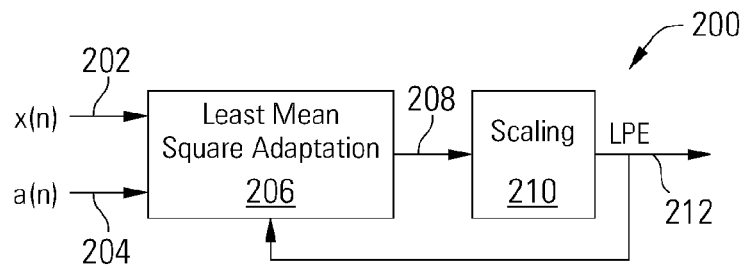
FIG. 2A depicts a loop pulse estimation circuit with an absolute sum constraint in accordance with some embodiments of the present invention.

Turning to FIG. 2A, a loop pulse estimation circuit 200 with an absolute sum constraint is depicted in accordance with some embodiments of the present invention. Data samples 202 x(n) and detected values 204 a(n) are received by the loop pulse estimation circuit 200, where the detected values 204 represent the values of the data samples 202, either as detected by a data detection circuit, or as known values of the data samples 202, or as obtained in any suitable manner and representing the values of data samples 202, whether they are the actual true values or whether they are a determination of what are likely the true values. Data samples 202 x(n) and detected values 204 a(n) are processed in a least mean square adaptation circuit 206, also referred to herein as a loop pulse response calculation circuit, yielding unscaled loop pulse response taps 208. In some embodiments, the least mean square adaptation circuit 206 performs the calculation of Equation 1. The resulting unscaled loop pulse response taps 208 are scaled in scaling circuit 210, which performs the calculations of Equations 2-4 to yield loop pulse response taps 212. Again, the scaling circuit 210 may be disabled if the difference between the absolute sum LPE_ASUM of the loop pulse response taps and the target ADCMax is smaller than the threshold according to Equation 5, passing the unscaled loop pulse response taps 208 through as loop pulse response taps 212. The loop pulse response taps 212 from scaling circuit 210 are fed back to the least mean square adaptation circuit 206 for use in the next loop pulse estimation according to Equation 1 in a recursive process.

Figure 2B:
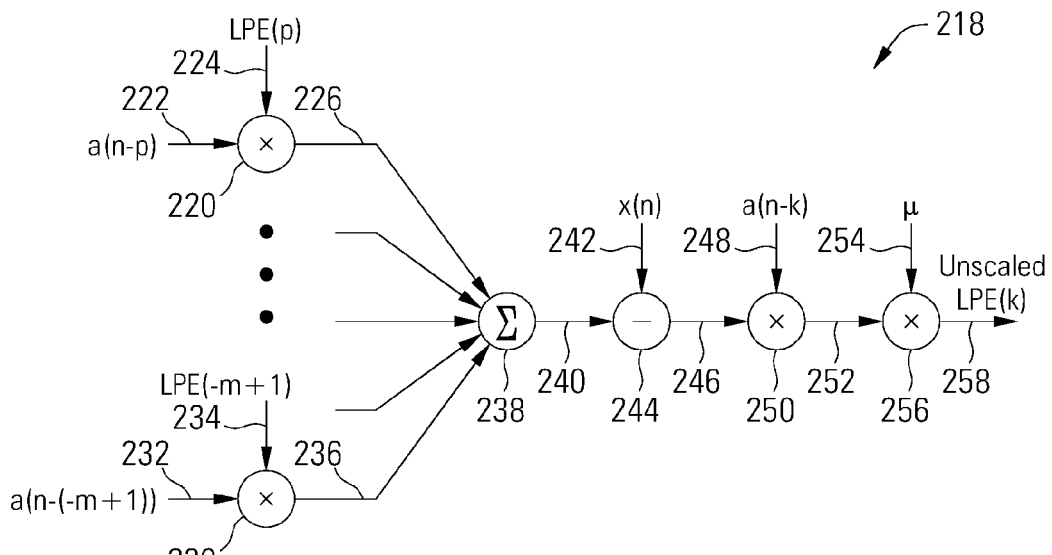
FIG. 2B depicts a least mean square circuit that may be included in the loop pulse estimation circuit of FIG. 2A in accordance with some embodiments of the present invention.

Turning to FIG. 2B, a least mean square circuit 218 that may be included in the loop pulse estimation circuit 200 of FIG. 2A in accordance with some embodiments of the present invention. In some embodiments, least mean square circuit 218 is used in place of least mean square adaptation circuit 206. The least mean square circuit 218 of FIG. 2B calculates an unscaled loop pulse estimation tap 258 with index k, or unscaled LPE(k). In some embodiments, an instance of the least mean square circuit 218 is used to calculate each of i tap coefficients in the loop pulse response according to Equation 1. In some embodiments, common circuits are shared between instances of the least mean square circuit 218, in parallel or serial fashion.

A multiplier 220 multiplies an earlier ideal data bit 222 a(n−p) by its corresponding tap coefficient 224 LPE(p), yielding product 226. This multiplication is performed for each of the i tap coefficients as shown in Equation 1, including multiplying later ideal data bit 232 a(n−(−m+1)) by its corresponding tap coefficient 234 LPE(−m+1), yielding product 236, and calculating the products for all of the i tap coefficients between index p and (−m+1). The products 226 and 236 and all between them are totaled in summing circuit 238 to yield sum 240. Subtraction circuit 244 subtracts the sum 240 from the data sample 242 x(n), yielding difference 246. Difference 246 is multiplied by the ideal data bit 248 a(n−k) corresponding to the tap coefficient with index k currently being calculated, yielding product 252. The product 252 is multiplied by update gain 254 μ in multiplier 256, yielding the unscaled tap coefficient 258 for tap index k. The update gain 254 μ may be set at any suitable value to control the rate at which the tap coefficients are to be adapted. A larger update gain 254 μ provides faster noise correction, but is less stable.

Figure 2C:
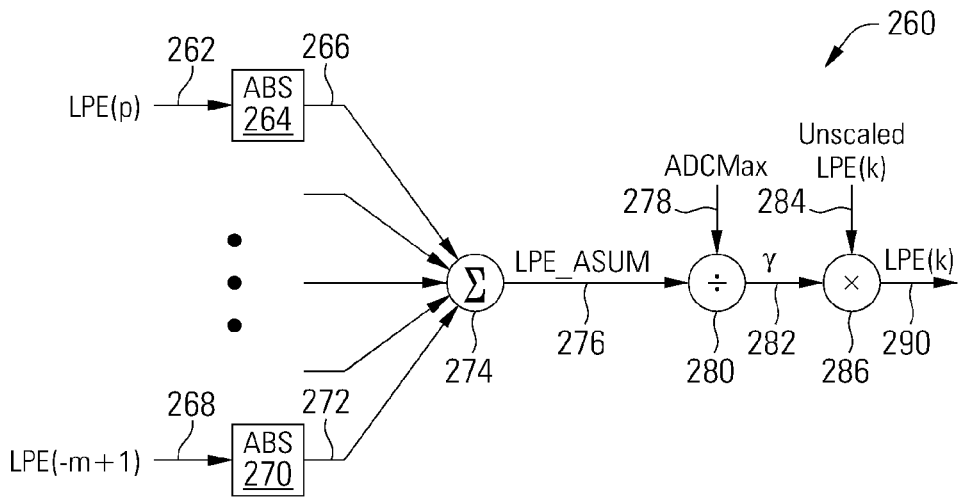
FIG. 2C depicts a scaling circuit that may be included in the loop pulse estimation circuit of FIG. 2A to constrain the loop pulse response taps in accordance with some embodiments of the present invention.

Turning to FIG. 2C, a scaling circuit 260 is depicted that may be included in the loop pulse estimation circuit 200 of FIG. 2A to constrain the loop pulse response taps in accordance with some embodiments of the present invention. In some embodiments, scaling circuit 260 is used in place of scaling circuit 210. The absolute value of each unscaled tap coefficient from LPE(p) 262 to LPE(−m+1) 268 is calculated in absolute value circuits 266, 272 etc, and the resulting absolute values (e.g., 266, 272) are totaled in summing circuit 274 to yield the absolute sum 276 LPE_ASUM of the loop pulse response taps. The scaling factor 282 γ is calculated by dividing the target 278 ADCMax by the absolute sum 276 LPE_ASUM in divider circuit 280. The unscaled tap coefficient 284 is multiplied by the scaling factor 282 γ in multiplier 286 to yield scaled tap coefficient 290 LPE(k). Again, this scaling is disabled in some embodiments according to Equation 5 when |LPE_ASUM−ADCMax| is smaller than a threshold. The threshold level can be set at any suitable level to prevent oscillation around target 278 ADCMax.

Figure 3:
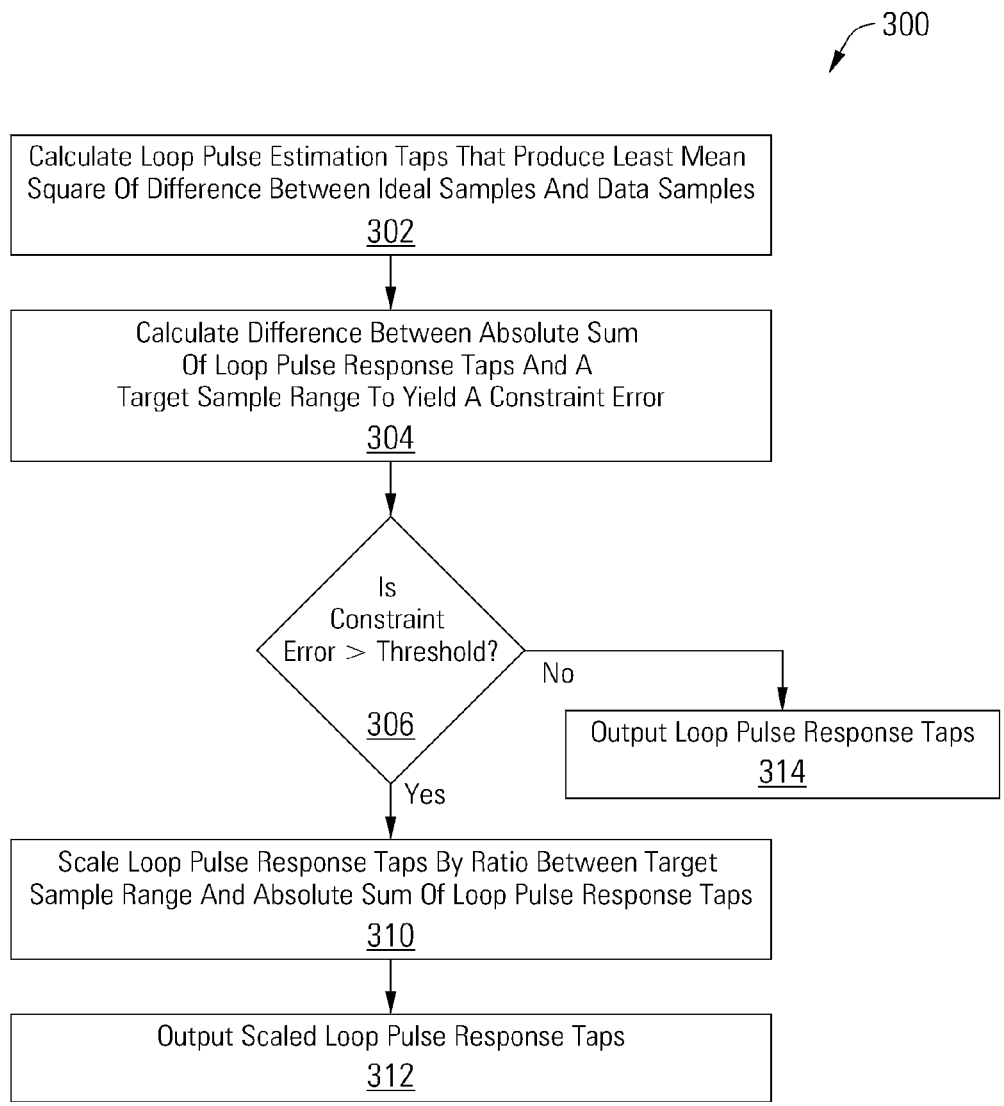
FIG. 3 is a flow diagram showing a method for adapting a loop pulse estimation using an absolute sum constraint in accordance with some embodiments of the present invention.

Turning now to FIG. 3, a flow diagram 300 shows a method for adapting a loop pulse estimation using an absolute sum constraint in accordance with some embodiments of the present invention. Following flow diagram 300, loop pulse response taps are calculated that produce the least mean square of difference between ideal samples and data samples (block 302). In some embodiments, this is performed using Equation 1. The difference between absolute sum of loop pulse response taps and a target sample range is calculated to yield a constraint error (block 304). A determination is made as to whether the constraint error is greater than a threshold (block 306). If the constraint error is greater than the threshold, the loop pulse response taps are scaled by the ratio between the target sample range and the absolute sum of loop pulse response taps (block 310), and the scaled loop pulse response taps are output (block 312). If the constraint error is not greater than the threshold, the loop pulse response taps are output without scaling (block 314).

Figure 4:
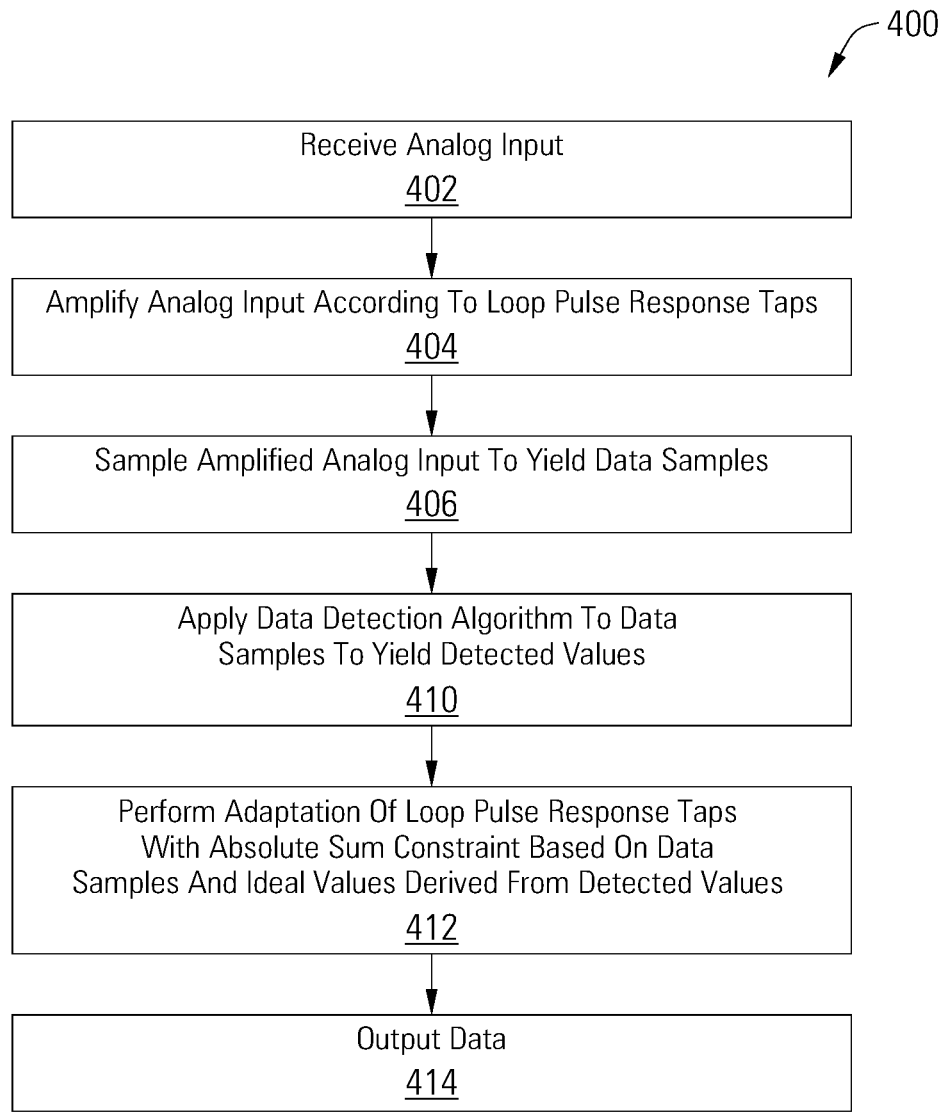
FIG. 4 is a flow diagram showing a method for processing data including loop pulse estimation with an absolute sum constraint in accordance with some embodiments of the present invention.

Turning now to FIG. 4, a flow diagram shows a method for processing data including loop pulse estimation with an absolute sum constraint in accordance with some embodiments of the present invention. Following flow diagram 400, an analog input is received (block 402). The analog input is amplified according to the loop pulse response taps (block 404). The amplified analog input is sampled to yield data samples (block 406). A data detection algorithm is applied to the data samples to yield detected values (block 410). An adaptation of loop pulse response taps is performed with absolute sum constraint based on data samples and ideal values derived from detected values (block 412). In some embodiments, this is performed in a recursive manner, with loop pulse response taps being estimated based at least in part on previous values of the loop pulse response taps. The loop pulse response taps are also estimated in a multi-stage operation, with values estimated based on a least mean square algorithm, then scaled according to an absolute sum constraint. In some embodiments, the scaling is disabled when the loop pulse response taps are relatively close to the desired amplitude value based on comparison with a threshold. When the detected values can be processed in any suitable manner and the resulting data output (block 414).

Figure 5:
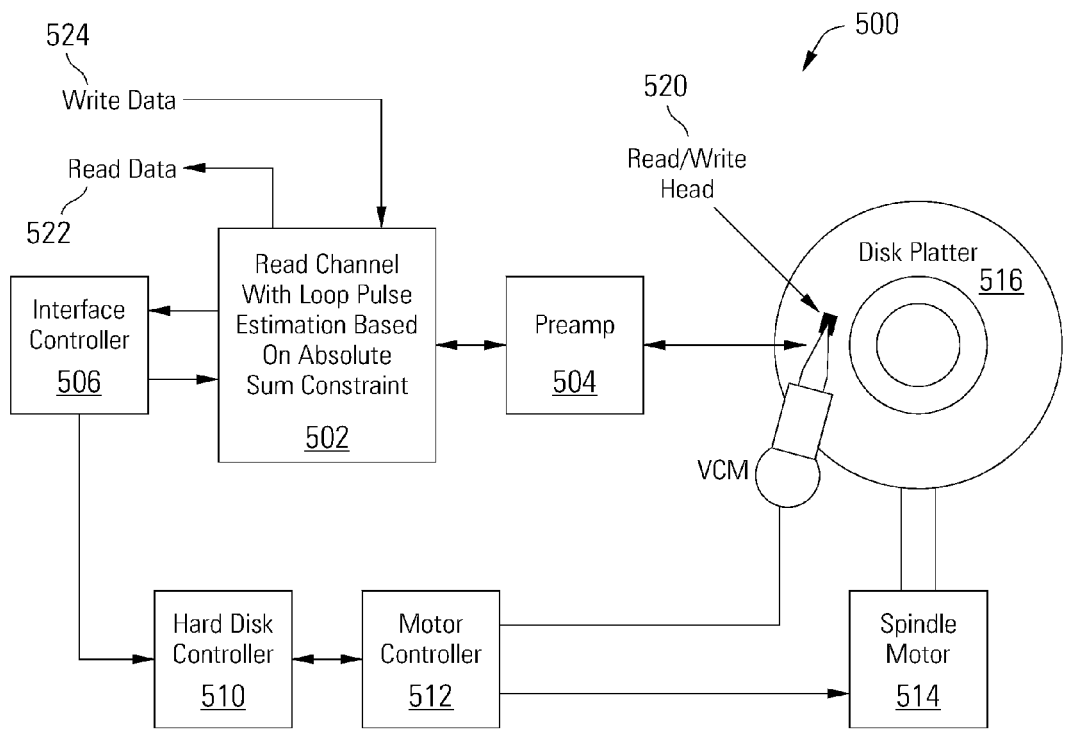
FIG. 5 depicts a storage system including a read channel with loop pulse estimation based on an absolute sum constraint in accordance with some embodiments of the present invention.

Turning to FIG. 5, a storage system 500 is illustrated as an example application of a read channel with loop pulse estimation with an absolute sum constraint in accordance with some embodiments of the present invention. The storage system 500 includes a read channel circuit 502 with loop pulse estimation with an absolute sum constraint in accordance with some embodiments of the present invention. Storage system 500 may be, for example, a hard disk drive. Storage system 500 also includes a preamplifier 504, an interface controller 506, a hard disk controller 510, a motor controller 512, a spindle motor 514, a disk platter 516, and a read/write head assembly 520. Interface controller 506 controls addressing and timing of data to/from disk platter 516. The data on disk platter 516 consists of groups of magnetic signals that may be detected by read/write head assembly 520 when the assembly is properly positioned over disk platter 516. In one embodiment, disk platter 516 includes magnetic signals recorded in accordance with either a longitudinal or a perpendicular recording scheme.

In a typical read operation, read/write head assembly 520 is accurately positioned by motor controller 512 over a desired data track on disk platter 516. Motor controller 512 both positions read/write head assembly 520 in relation to disk platter 516 and drives spindle motor 514 by moving read/write head assembly 520 to the proper data track on disk platter 516 under the direction of hard disk controller 510. Spindle motor 514 spins disk platter 516 at a determined spin rate (RPMs). Once read/write head assembly 520 is positioned adjacent the proper data track, magnetic signals representing data on disk platter 516 are sensed by read/write head assembly 520 as disk platter 516 is rotated by spindle motor 514. The sensed magnetic signals are provided as a continuous, minute analog signal representative of the magnetic data on disk platter 516. This minute analog signal is transferred from read/write head assembly 520 to read channel circuit 502 via preamplifier 504. Preamplifier 504 is operable to amplify the minute analog signals accessed from disk platter 516. In turn, read channel circuit 502 decodes and digitizes the received analog signal to recreate the information originally written to disk platter 516. This data is provided as read data 522 to a receiving circuit. While processing the read data, read channel circuit 502 performs loop pulse estimation with an absolute sum constraint. Such loop pulse estimation with an absolute sum constraint may be implemented consistent with the circuits and methods disclosed in FIGS. 1-4. A write operation is substantially the opposite of the preceding read operation with write data 524 being provided to read channel circuit 502. This data is then encoded and written to disk platter 516.

It should be noted that storage system 500 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 500, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 500 may be modified to include solid state memory that is used to store data in addition to the storage offered by disk platter 516. This solid state memory may be used in parallel to disk platter 516 to provide additional storage. In such a case, the solid state memory receives and provides information directly to read channel circuit 502. Alternatively, the solid state memory may be used as a cache where it offers faster access time than that offered by disk platter 516. In such a case, the solid state memory may be disposed between interface controller 506 and read channel circuit 502 where it operates as a pass through to disk platter 516 when requested data is not available in the solid state memory or when the solid state memory does not have sufficient storage to hold a newly written data set. Based upon the disclosure provided herein, one of ordinary skill in the art will recognize a variety of storage systems including both disk platter 516 and a solid state memory.

Figure 6:
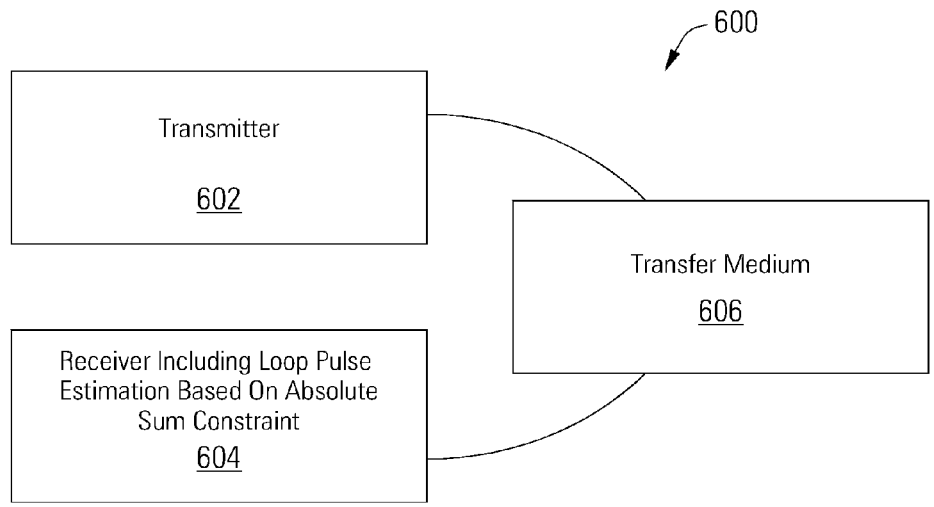
FIG. 6 depicts a wireless communication system including loop pulse estimation based on an absolute sum constraint in accordance with some embodiments of the present invention.

Turning to FIG. 6, a wireless communication system 600 or data transmission device including a receiver 604 with loop pulse estimation with an absolute sum constraint is shown in accordance with some embodiments of the present invention. The transmitter 602 is operable to transmit encoded information via a transfer medium 606 as is known in the art. The encoded data is received from transfer medium 606 by receiver 604. Receiver 604 performs loop pulse estimation with an absolute sum constraint. Such loop pulse estimation with an absolute sum constraint may be implemented consistent with the circuits and methods disclosed in FIGS. 1-4.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for loop pulse estimation with an absolute sum constraint. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   a digital data input operable to receive digital data;
   a digital data values input operable to receive values of the digital data;
   a loop pulse response estimation circuit operable to calculate a loop pulse response based on the digital data and the values of the digital data and based at least in part on past values of the loop pulse response; and a scaling circuit operable to scale the loop pulse response based at least in part on an absolute sum of the loop pulse response to yield a scaled loop pulse response.

2. The data processing system of claim 1, wherein the past values of the loop pulse response comprise past values of the scaled loop pulse response.

3. The data processing system of claim 1, wherein the loop pulse response comprises a plurality of tap coefficients.

4. The data processing system of claim 1, wherein the loop pulse response estimation circuit is operable to apply a least mean square algorithm to the digital data and the values of the digital data.

5. The data processing system of claim 1, wherein the loop pulse response estimation circuit comprises a summing circuit operable to total a plurality of products, each of the products comprising one of a plurality of taps in the loop pulse response multiplied with a corresponding one of the values of the digital data.

6. The data processing system of claim 5, wherein the loop pulse response estimation circuit further comprises a subtraction circuit operable to subtract an output of the summing circuit from a bit of the digital data.

7. The data processing system of claim 6, wherein the loop pulse response estimation circuit further comprises a multiplication circuit operable to multiply an output of the subtraction circuit by one of the values of the digital data corresponding to one of the plurality of taps being calculated.

8. The data processing system of claim 7, wherein the loop pulse response estimation circuit further comprises a second multiplication circuit operable to multiply an output of the multiplication circuit by an update gain to yield an unscaled tap in the loop pulse response.

9. The data processing system of claim 1, wherein the scaling circuit comprises a plurality of absolute value circuits operable to calculate an absolute value of each of a plurality of taps in the loop pulse response.

10. The data processing system of claim 9, wherein the scaling circuit further comprises a summing circuit operable to total the plurality of absolute values to yield the absolute sum.

11. The data processing system of claim 1, wherein the scaling circuit comprises a divider circuit operable to divide a target gain by the absolute value to yield a scaling factor, wherein the scaling circuit is operable to scale the loop pulse response by the scaling factor.

12. The data processing system of claim 11, further comprising:
a variable gain amplifier operable to amplify an analog signal according to a gain error signal to yield an amplified analog signal, wherein the gain error signal is based at least in part on the scaled loop pulse response; and
an analog to digital converter operable to sample the amplified analog signal to yield the digital data, wherein the target gain is based at least in part on a range of the analog to digital converter.

13. The data processing system of claim 12, further comprising a gain loop circuit operable to compare the digital data with the values of the digital data to yield an error signal, and to convolve the error signal with the scaled loop pulse response to yield the gain error signal.

14. The data processing system of claim 1, wherein the scaling circuit is operable to disable the scaling when an absolute value of the absolute sum minus a target gain is less than a threshold.

15. The data processing system of claim 1, wherein the system is implemented as an integrated circuit.

16. The data processing system of claim 1, wherein the system is incorporated in a storage device.

17. A method for adapting a loop pulse estimation, comprising:
amplifying an analog signal according to a gain error signal to yield an amplified analog signal;
sampling the amplified analog signal to yield data samples;
calculating loop pulse response taps that produce a least mean square of a difference between the data samples and ideal versions of the data samples; and
scaling the loop pulse response taps by a ratio between a target sample range and an absolute sum of the loop pulse response taps to yield a scaled loop pulse response, wherein the gain error signal is based at least in part on the scaled loop pulse response.

18. The method of claim 17, further comprising calculating a difference between the absolute sum of the loop pulse response taps and the target sample range to yield a constraint error.

19. The method of claim 17, further comprising disabling the scaling when the constraint error is less than a threshold.

20. A storage device, comprising:
a storage medium;
a head assembly disposed in relation to the storage medium and operable to provide a sensed signal corresponding to a data set on the storage medium; and
a read channel circuit comprising a loop pulse response estimation circuit operable to calculate a loop pulse response based on the digital data in the data set and on values of the digital data and based at least in part on past values of the loop pulse response, and a scaling circuit operable to scale the loop pulse response based at least in part on an absolute sum of the loop pulse response to yield a scaled loop pulse response.

* * * * *